United States Patent [19]

Katamine et al.

[11] Patent Number: 5,669,269

[45] Date of Patent: Sep. 23, 1997

[54] JOINT DRIVING STRUCTURE FOR INDUSTRIAL ROBOT

[75] Inventors: Kuniaki Katamine; Shigeo Matsushita, both of Fukuoka, Japan

[73] Assignee: Kabushiki Kaisha Yaskawa Denki, Fukuoka, Japan

[21] Appl. No.: 454,275

[22] PCT Filed: Oct. 26, 1994

[86] PCT No.: PCT/JP94/01790

§ 371 Date: Jun. 21, 1995

§ 102(e) Date: Jun. 21, 1995

[87] PCT Pub. No.: WO95/11781

PCT Pub. Date: Apr. 5, 1994

[30] Foreign Application Priority Data

Oct. 27, 1993 [JP] Japan ..................... 5-292658

[51] Int. Cl.⁶ ................. B25J 9/06; B25J 17/00
[52] U.S. Cl. ................. 74/490.02; 74/490.03; 414/918; 901/23; 901/25; 901/28
[58] Field of Search ............ 74/490.02, 490.03, 74/490.05; 901/23, 25, 28; 414/918

[56] References Cited

U.S. PATENT DOCUMENTS 4,651,591  3/1987  Wurst ..................... 901/28 X
4,840,090  6/1989  Iwata ..................... 901/25 X
5,375,480  12/1994 Nihei et al. ............... 74/490.02

FOREIGN PATENT DOCUMENTS 2617-751   1/1989  France ................... 901/28
3444-420   6/1986  Germany ................. 901/28
58-120487  7/1983  Japan .
1193185    8/1989  Japan .
2116482    5/1990  Japan .
3-190693   8/1991  Japan ................... 901/28
1313-710   5/1987  U.S.S.R. ................ 901/23

Primary Examiner—Charles A. Marmor
Assistant Examiner—Troy Grabow
Attorney, Agent, or Firm—Jordan and Hamburg

[57] ABSTRACT

A joint driving structure for an industrial robot includes a first arm having a box-like end portion, a second arm having a box-like end portion, and a bearing between the end portion of the first arm and the end portion of the second arm. A driving motor is disposed at the end portion of the second arm, the driving motor having a rotational shaft, and a reduction gear mechanism coupled to the rotational shaft and operable to rotationally drive the second arm. The driving motor has a fixing portion, the driving motor further having an opposite-to-load side bracket fixed to the fixing portion of the driving motor. The reduction gear mechanism has a fixing portion fixed to the fixing portion of the drive motor, the reduction gear mechanism having an output portion fixed to the end portion of the first arm.

4 Claims, 1 Drawing Sheet

JOINT DRIVING STRUCTURE FOR INDUSTRIAL ROBOT

DESCRIPTION

This invention relates to a joint driving structure between arms in an industrial multi-joint robot.

BACKGROUND OF THE INVENTION

Hitherto, as a joint driving structure between arms of an industrial multi-joint robot, there is a joint driving structure in which a fixing portion of a reduction gear is fixed to the end portion of a first arm, and one end of a second arm is fixed to the reduction gear output shaft provided at the fixing portion through a bearing thus to rotationally drive the reduction gear input shaft by means of a driving motor to rotate the second arm about the reduction gear output shaft e.g., Japanese Tokkaihei No. 1-193185 (Japanese Patent Application Laid Open No. 193185/1989) and Japanese Tokkaihei No. 2-116482 (Japanese Patent Application Laid Open No. 116482/1990).

Moreover, in order to allow the joint portion to be compact, as shown in FIG. 2, for example, a driving motor B for rotationally driving a second arm A, a rotation detector C for detecting rotation of the driving motor B, and a reduction gear D are built-in (integrated or incorporated) within a closed box-like first arm E so that a cable F for supply of power of the driving motor B and a lead wire G of the rotation detector C are not exposed to the exterior. Moreover, a cable H for making connection to an end effector (not shown) provided at the second arm A from the first arm E is exposed to the exterior through a wiring hole I provided at the side surface from the inside of the first arm E, and is inserted into the inside portion of the second arm A from a wiring hole J provided at the side surface of the second arm A.

However, in the case of the prior art of Japanese Patent Application Laid Open No. 193185/1989 and Japanese Patent Application Laid Open No. 116482/1990, etc., since the cable of the driving motor and/or lead wire of the rotation detector are exposed to the exterior, there was the possibility that when the arm carries out moving operations, the cable and/or lead wire as mentioned above might come into contact with an object of the exterior so that they are broken.

Moreover, labor to implement sealing, etc. to the wiring hole through which a cable connecting to the end effector is passed, was required.

Further, in the case of the joint driving structure in which the driving motor is built-in (integrated) at the inside of the box-like arm, since the driving motor is airtightly closed within the arm, heat produced from the driving motor was only radiated through the reduction gear or the arm from the load side flange of the driving motor. Accordingly, in the case where attempt is made to operate the arm at high frequency (many times), cooling was disadvantageously difficult to be sufficiently carried out.

SUMMARY OF THE INVENTION

An object of this invention is to provide a joint driving structure which permits a cable or lead wire to be wired at the inside of the arm, and which radiates heat produced from the driving motor through the arm from both surfaces of the load side and the opposite-to-load side to cool it thus to permit high frequency arm operations.

This invention is directed to a joint driving structure for an industrial robot in which a box-like end portion of a first arm and a box-like end portion of a second arm are rotatably connected through a bearing, an input portion of a reduction gear is coupled to the rotational shaft of a driving motor for rotationally driving the second arm, and the driving motor is built-in (integrated) at the end portion of the second arm, wherein an opposite-to-load side bracket fixed at the fixing portion of the driving motor is fixed to the end portion of the second arm, a fixing portion of the reduction gear is fixed to the fixing portion of the driving motor, and an output portion of the reduction gear is fixed to the end portion of the first arm.

Moreover, a housing portion for supporting the bearing provided at the end portion of the second arm is formed hollow to provide a space portion passing through the end portion of the first arm from the housing portion thus to allow a cable to be passed from the first arm to the second arm through the space portion.

For this purpose, the end portion of the second arm is rotatably coupled to the end portion of the first arm through the bearing, the opposite-to-load side bracket of the driving motor to which the reduction gear is connected is coupled to the second arm, and the output side of the reduction gear is coupled to the first arm to radiate heat produced from the driving motor from both the load side and the opposite-to-load side of the driving motor. Accordingly, it is possible to carry out high frequency arm operations with good cooling effect.

Moreover, since there is provided a space portion passing through the inside portion of the first arm from the hollow housing portion of the box-shaped second arm to dispose cables for the driving motor, rotation detector and end effector, etc. at the inside of the first arm from the second arm, there is no possibility that when the arm is operated, cables may come into contact with any object of the exterior. Accordingly, a complete closed structure in which no cable is exposed to the exterior can be provided, thus making it possible to safely carry out operations.

Accordingly, in accordance with this invention, since the driving motor for rotationally driving the second arm is built-in (integrated) at the end portion of the second arm, and cable for the driving motor, lead wire for the rotation detector, and cable for the end effector of the second arm, etc. are disposed at the inside of the box-like first and second arms, cables, etc. can be built-in (integrated) at the inside of the arm. Thus, it is possible to ensure a closed structure, and to safely operate the first arm and the second arm without the possibility that cables, etc. might come into contact with objects at the exterior.

In addition, since heat produced from the driving motor is transmitted to the first arm and the second arm from both the load side and the opposite-to-load side and is radiated therefrom, the cooling effect becomes large, thus making it possible to advantageously provide a joint driving structure for an industrial robot which can realize high frequency arm operations without increasing the motor capacity.

DESCRIPTION OF THE PREFERRED EMBODIMENTS

This invention will now be described in accordance with the embodiment shown.

Figure 1:
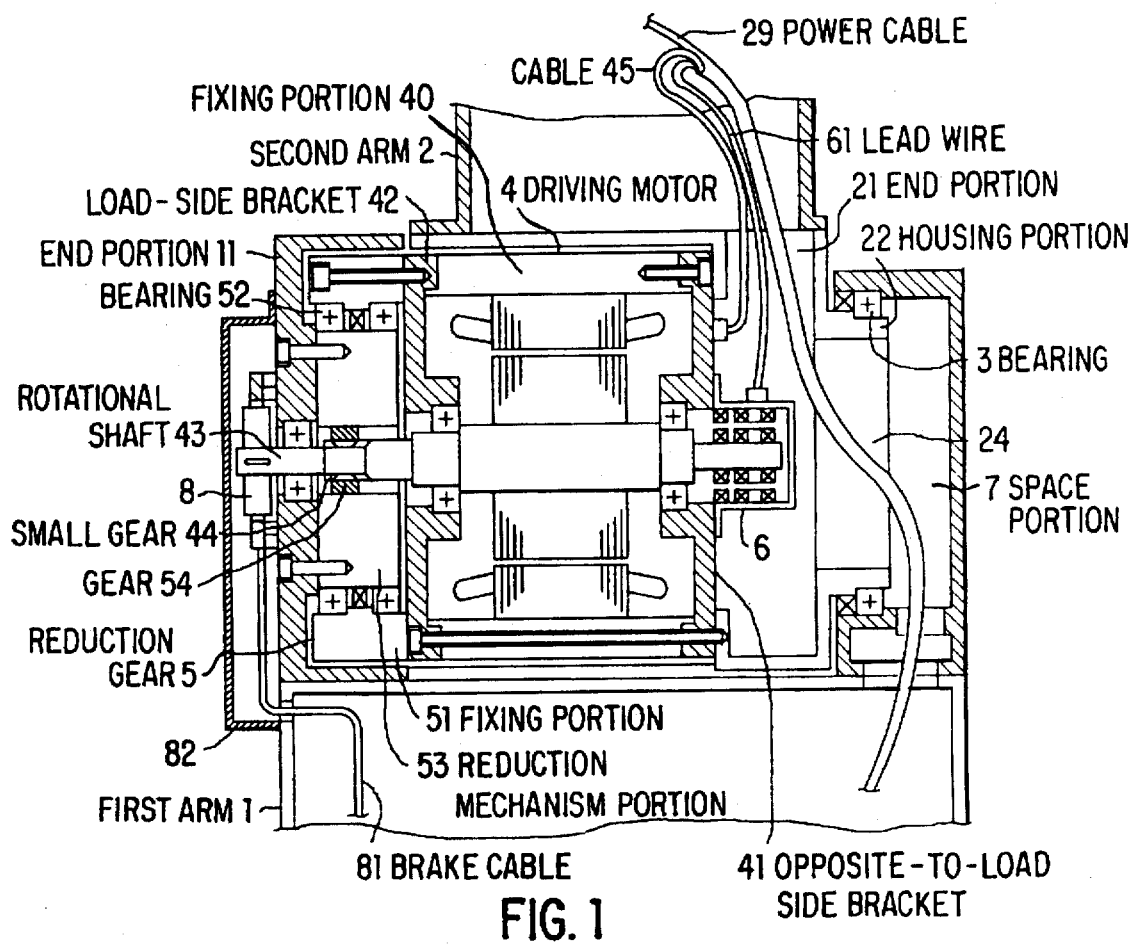
FIG. 1 is a side cross sectional view showing an embodiment of this invention.
Figure 2:
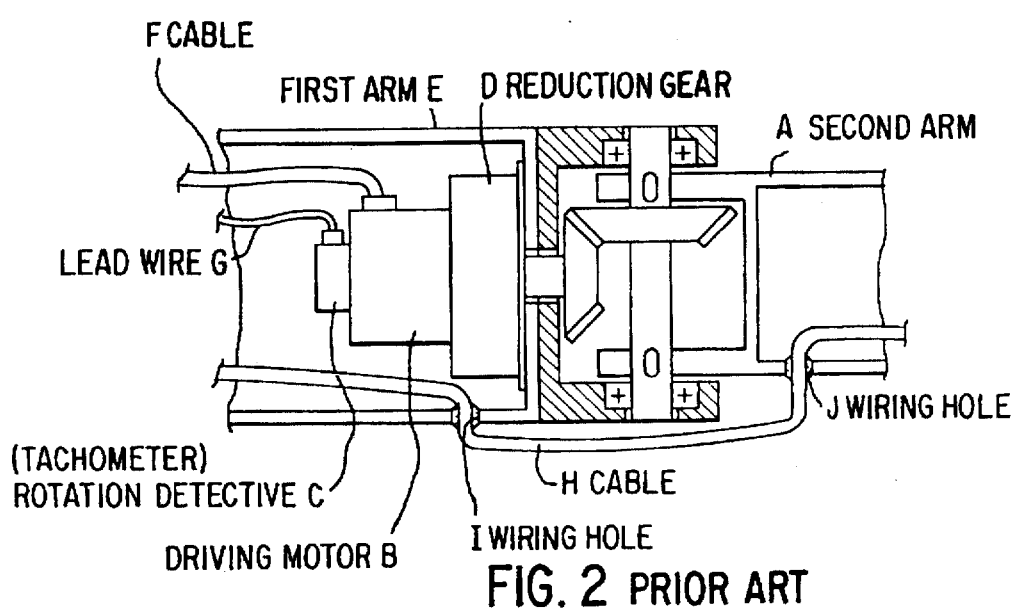
FIG. 2 is a side cross sectional view showing the prior art.

FIG. 1 is a side cross sectional view showing an embodiment of this invention.

In the FIG. 1, an end portion 11 of a first arm 1 and an end portion 21 of a second arm 2 are formed box-shaped, and a bearing 3 is provided between the inside of the end portion 11 and a hollow housing portion 22 provided at the end portion 21 so as to rotatably support the second arm 2. The end portion 21 of the second arm 2 is formed box-shaped, and a driving motor 4 for rotationally driving the second arm 2 is disposed therewithin so as to become coaxial with the bearing 3 therewithin, and an opposite-to-load side bracket 41 fixed at a fixing portion 40 of the driving motor 4 is fixed to the end portion 21. Moreover, a ring-shaped fixing portion 51 of a reduction gear 5 is fixed to the fixing portion 40 of the driving motor 4 through a load side bracket 42. A reduction mechanism portion 53 which serves as an output portion is supported through a bearing 52 at the inside of the fixing portion 51, and the side surface of the reduction mechanism portion 53 is fixed to the end portion 11 of the first arm 1. A small gear (toothed wheel) 44 is provided at a rotational shaft 43 projected from the central portion of the load side bracket 42 of the driving motor 4, and this gear 44 is meshed with a gear (toothed wheel) 54 provided at the inside of the reduction mechanism portion 53 of the reduction gear 5.

A rotation detector 6 is built-in (integrated) at the opposite-to-load side of the driving motor 4. A lead wire 61 for input/output of the rotation detector 6 is wired in such a manner that it is once fixed within the second arm 2, is fixed along power cable 29 which will be described later, is passed through the inside portion 24 of the housing portion 22, and is passed through a Space portion 7 passing through the inside of the first arm 1. Power cable 29 for delivering power to end effector (not shown) of the second arm 2 is adapted to be also passed through the inside portion of the housing portion 22 from the inside of the first arm 1, and is passed through the inside portion of the second arm 2. A cable 45 of the driving motor 4 is also wired in such a manner that it is once fixed along the power cable 29 within the second arm 2 similarly to the lead wire 61 of the rotation detector 6, and is passed through the space portion 7 along with the power cable 29. An electromagnetic brake 8 for holding is provided at the end portion of the rotational shaft 43 of the load side of the driving motor 4, and a cable 81 for the electromagnetic brake 8 is passed through the inside portion of the first arm 1 from the inside of a cover 82 of the electromagnetic brake 8.

It is to be noted that electromagnetic brake 8 may be fixed at the opposite-to-load side bracket 41, and cable 81 for the brake may be wired within the first arm 1 in such a manner that it is passed through the space portion 7 along with cable 45, lead wire 61 and power cable 23.

When driving motor 4 is driven to rotate the rotational shaft 43, a torque which attempts to rotate the first arm 1 is produced through small gear 44, gear 54 and reduction mechanism portion 53 of the reduction gear 5. When the first arm 1 is fixed on a base, etc., the second arm 2 in which driving motor 4 is fixed is relatively rotated by reaction of the torque produced with respect to the first arm 1 through the bearing 3.

Heat produced from the driving motor 4 is transmitted from the opposite-to-load side bracket 41 to the second arm 2, and is transmitted to the first arm I through the reduction gear 5 from the load side bracket 42. Thus, such heat is radiated.

It is to be noted that while explanation has been given in connection with the case where the first arm is fixed on the base, and cables, or the like, such as, for example, cable 45, lead wire 61, power cable 29, and brake cable 81, etc. are passed through the space portion 7 from the end portion of the second arm 2, and is passed through the inside portion of the first arm 1, the above-mentioned configuration may be applied also in connection with the case where second arm is fixed on the base, brake cable 81 is fixed along the power cable 29 and is passed through the second arm 2 from the first arm 1, and cable 45 and lead wire 61 are directly passed through the inside portion of the second arm 2.

This invention can be utilized, when applied to a joint driving structure between arms of an industrial robot, in the field for manufacturing or providing a joint driving structure of an industrial robot, which can integrate or incorporate cables, etc. at the inside of the arm, can ensure a closed structure, and can safely operate first and second arms without allowing cables, etc. to be in contact with objects at the exterior.

What is claimed is:

1. A joint driving structure for an industrial robot comprising a first arm having a box-like end portion, a second arm having a box-like end portion, a bearing between said box-like end portion of said first arm and said box-like end portion of said second arm, a driving motor disposed at the box-like end portion of said second arm, said driving motor having a rotational shaft, a reduction gear mechanism coupled to said rotational shaft and operable to rotationally drive said second arm, said driving motor having a fixing portion, said driving motor further having an opposite-to-load side bracket fixed to said fixing portion of said driving motor, said reduction gear mechanism having a fixing portion fixed to said fixing portion of said drive motor, said reduction gear mechanism having an output portion fixed to said box-like end portion of said first arm, said box-like end portion of said first arm having a space portion passing into the inside of said first arm, a housing section on said box-like end portion of said second arm, said housing section supporting said bearing, said housing section having an internal space extending into said space portion in said box-like end portion of said first arm, and a power cable extending between said first arm and said second arm, said cable passing through said space portion in said box-like end portion of said first arm and through said internal space of said housing section, said power cable having one portion which extends continuously from inside of said first arm, through said space portion in said box-like end portion of said first arm, through said internal space of said housing section, and into the inside of said second arm.

2. A joint driving structure for an industrial robot comprising a first arm having a box-like end portion, a second arm having a box-like end portion, a bearing between said boxlike end portion of said first arm and said box-like end portion of said second arm, a driving motor disposed at the box-like end portion of said second arm, a motor lead connected to said motor, said motor lead extending through said box-like end portion of said second arm to the inside of said second arm, said driving motor having a rotational shaft, a reduction gear mechanism coupled to said rotational shaft and operable to rotationally drive said second arm, said driving motor having a fixing portion, said driving motor further having an opposite-to-load side bracket fixed to said fixing portion of said driving motor, said reduction gear mechanism having a fixing portion fixed to said fixing portion of said drive motor, said reduction gear mechanism having an output portion fixed to said box-like end portion of said first arm, said box-like end portion of said first arm having a space portion passing into the inside of said first arm, a housing section on said box-like end portion of said second arm, said housing section supporting said bearing, said housing section having an internal space extending into said space portion in said box-like end portion of said first arm, and a power cable extending between said first arm and said second arm, said cable passing through said space portion in said boxlike end portion of said first arm and through said internal space of said housing section, said motor lead leading to said power cable inside said second arm.

3. A joint driving structure for an industrial robot comprising a first arm having a box-like end portion, a second arm having a box-like end portion, a bearing between said boxlike end portion of said first arm and said box-like end portion of said second arm, a driving motor disposed at the box-like end portion of said second arm, said driving motor having a rotational shaft, a reduction gear mechanism coupled to said rotational shaft and operable to rotationally drive said second arm, said driving motor having a fixing portion, said driving motor further having an opposite-to-load side bracket fixed to said fixing portion of said driving motor, said reduction gear mechanism having a fixing portion fixed to said fixing portion of said drive motor, said reduction gear mechanism having an output portion fixed to said box-like end portion of said first arm, said box-like end portion of said first arm having a space portion passing into the inside of said first arm, a housing section on said box-like end portion of said second arm, said housing section supporting said bearing, said housing section having an internal space extending into said space portion in said box-like end portion of said first arm, a power cable extending between said first arm and said second arm, said cable passing through said space portion in said box-like end portion of said first arm and through said internal space of said housing section, an electromagnetic brake fixed to said opposite-to-load side bracket, and a brake lead connected to said electromagnetic brake and passing through said space portion of said box-like end portion of said first arm into the inside of said first arm.

4. A joint driving structure for an industrial robot comprising a first arm having a box-like end portion, a second arm having a box-like end portion, a bearing between said boxlike end portion of said first arm and said box-like end portion of said second arm, a driving motor disposed at the box-like end portion of said second arm, said driving motor having a rotational shaft, a reduction gear mechanism coupled to said rotational shaft and operable to rotationally drive said second arm, said driving motor having a fixing portion, said driving motor further having an opposite-to-load side bracket fixed to said fixing portion of said driving motor, said reduction gear mechanism having a fixing portion fixed to said fixing portion of said drive motor, said reduction gear mechanism having an output portion fixed to said box-like end portion of said first arm, said box-like end portion of said first arm having a space portion passing into the inside of said first arm, and further comprising a housing section on said box-like end portion of said second arm, said housing section supporting said bearing, said housing section having an internal space extending into said space portion in said box-like end portion of said first arm, a power cable extending between said first arm and said second arm, said cable passing through said space portion in said box-like end portion of said first arm and through said internal space of said housing section, a rotation detector mounted on said opposite-to-load side bracket, and a rotation detector lead connected to said rotation detector, said rotation detector lead extending through said box-like end portion of said second arm to the inside of said second arm, said rotation detector lead leading to said power cable inside said second arm.

* * * * *